US010843072B2

(12) United States Patent
Urakawa et al.

(10) Patent No.: US 10,843,072 B2
(45) Date of Patent: Nov. 24, 2020

(54) INFORMATION PROCESSING APPARATUS, SERVER SYSTEM, AND STATUS MANAGEMENT METHOD

(71) Applicant: SONY INTERACTIVE ENTERTAINMENT INC., Tokyo (JP)

(72) Inventors: Soshi Urakawa, Tokyo (JP); Nobukazu Koyama, Tokyo (JP)

(73) Assignee: SONY INTERACTIVE ENTERTAINMENT INC., Tokyo (JP)

( * ) Notice: Subject to any disclaimer, the term of this patent is extended or adjusted under 35 U.S.C. 154(b) by 0 days.

(21) Appl. No.: 16/486,638

(22) PCT Filed: Feb. 27, 2018

(86) PCT No.: PCT/JP2018/007255
§ 371 (c)(1),
(2) Date: Aug. 16, 2019

(87) PCT Pub. No.: WO2018/163915
PCT Pub. Date: Sep. 13, 2018

(65) Prior Publication Data
US 2019/0366207 A1 Dec. 5, 2019

(30) Foreign Application Priority Data

Mar. 6, 2017 (JP) .................................. 2017-042197

(51) Int. Cl.
*A63F 13/35* (2014.01)
*H04L 29/08* (2006.01)
*H04L 29/06* (2006.01)

(52) U.S. Cl.
CPC .............. *A63F 13/35* (2014.09); *H04L 67/24* (2013.01); *H04L 67/26* (2013.01); *H04L 67/38* (2013.01); *H04L 67/42* (2013.01)

(58) Field of Classification Search
CPC .......... A63F 13/35; H04L 67/24; H04L 67/26
See application file for complete search history.

(56) References Cited

U.S. PATENT DOCUMENTS

2008/0220854 A1* 9/2008 Midgley ................. A63F 13/35
463/25
2008/0220869 A1* 9/2008 Midgley ................. A63F 13/12
463/40

(Continued)

FOREIGN PATENT DOCUMENTS

JP      2012-73674 A      4/2012
WO    2016/109066 A1    7/2016

OTHER PUBLICATIONS

International Search Report and Written Opinion dated May 15, 2018, from International Application No. PCT/JP2018/007255, 6 sheets.

(Continued)

Primary Examiner — William H McCulloch, Jr.
Assistant Examiner — Ankit B Doshi
(74) Attorney, Agent, or Firm — Katten Muchin Rosenman LLP

(57) ABSTRACT

A login management section 112 allows a user to log in to an information processing apparatus 10. A status management section 120 manages the status of the information processing apparatus 10. A change instruction acceptance section 144 accepts an instruction for change from a server. When the user has logged in to the information processing apparatus 10 that in turn has signed in to a service, the status management section 120 manages the information processing apparatus 10 in either an active status or a listen status. The active status is a status in which the information processing apparatus 10 is in an online state and allowed to use the service, and the listen status is a status in which the (Continued)

information processing apparatus 10 is in an offline state that disables game execution and is allowed to use the service.

17 Claims, 8 Drawing Sheets

(56) References Cited

U.S. PATENT DOCUMENTS

2013/0072306 A1\* 3/2013 Parnprome ............. A63F 13/35
　　　　　　　　　　　　　　　　　　　　　463/42
2017/0346851 A1\* 11/2017 Drake ................... H04W 12/02

OTHER PUBLICATIONS

International Preliminary Report on Patentability dated Sep. 19, 2019, from International Application No. PCT/JP2018/007255, 14 sheets.

\* cited by examiner

FIG. 3

| | STATUS | | | |
|---|---|---|---|---|
| | CUTOFF | STANDBY | ACTIVE | LISTEN |
| APPARATUS PRESENCE | OFFLINE | OFFLINE | ONLINE | OFFLINE |
| SIGN-IN STATE | SIGN-OUT | SIGN-IN | SIGN-IN | SIGN-IN |
| LOGIN STATE | LOGOUT | LOGOUT | LOGIN | LOGIN |
| PUSH NOTIFICATION DESTINED FOR ACTIVE DEVICE (FIRST PUSH NOTIFICATION) | × | × | ○ | ○ |
| PUSH NOTIFICATION DESTINED FOR STANDBY AND ACTIVE DEVICES (SECOND PUSH NOTIFICATION) | × | ○ | ○ | ○ |

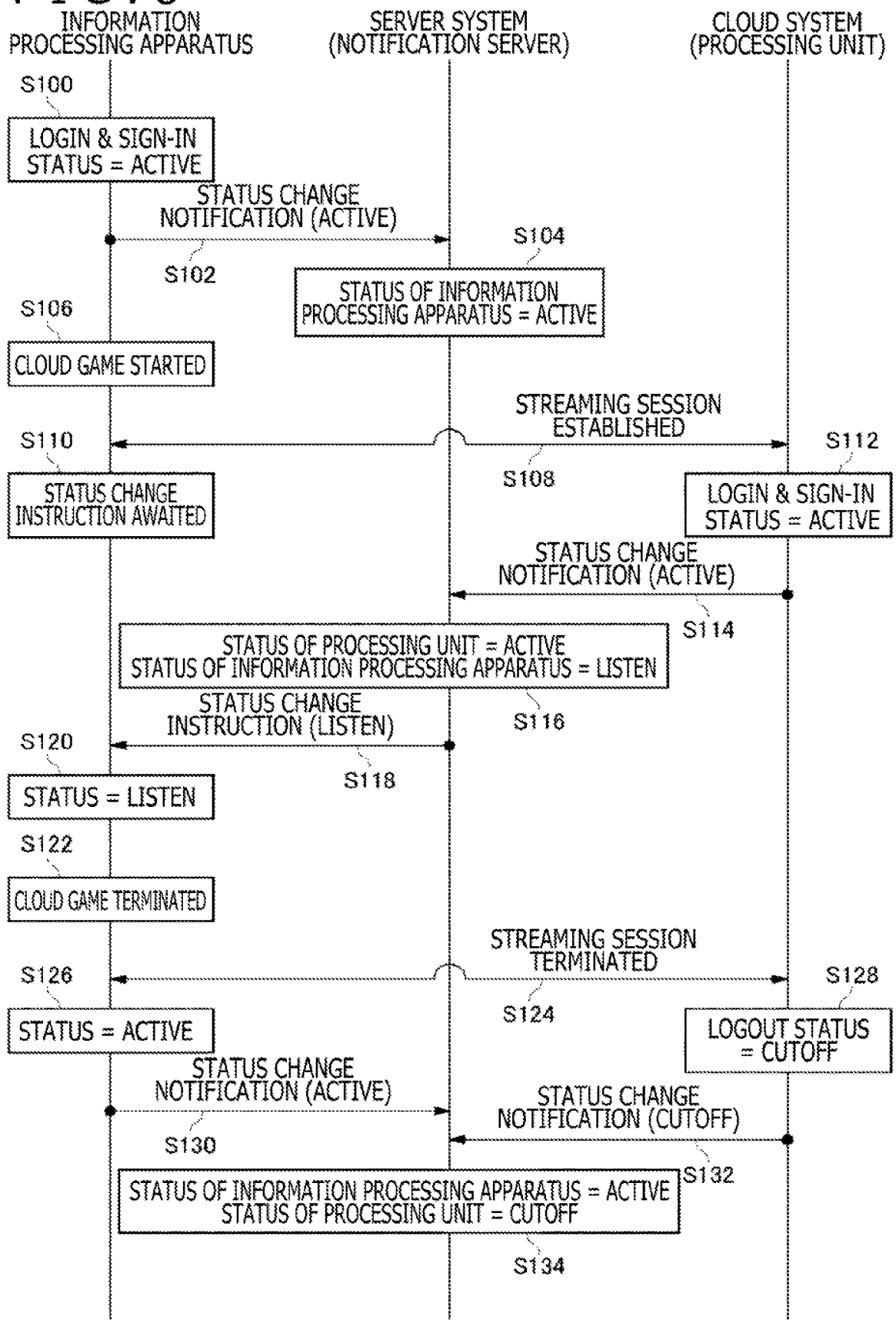

INFORMATION PROCESSING APPARATUS, SERVER SYSTEM, AND STATUS MANAGEMENT METHOD

TECHNICAL FIELD

The present invention relates to techniques for managing the status of client apparatuses connected with a network.

BACKGROUND ART

Servers that offer network services manage users on the basis of a user account for identifying each user. A user signs in to a network service from a client apparatus using his or her user account so as to have the client apparatus recognized by the server that in turn allows the user to make use of the network service. User management is conducted under policies that vary from one service provider to another. In the case where multiple client apparatuses of a single user are allowed to be online at the same time, a very complicated scheme is needed to strictly implement the process of data synchronization, which can be costly.

SUMMARY

Technical Problem

As a practical operating policy in these circumstances, a user management method has been proposed that limits one online client apparatus to each user. Under this operating policy, in order to eliminate the situation where two client apparatuses of one user are simultaneously online, the server keeps one of the client apparatuses in an online state while forcing the other client apparatus into an offline state.

The server determines the destination to which the service is offered by managing the status of client apparatuses. The existing servers offer an online service only to the client apparatus managed in the online state. Thus the client apparatuses managed in the offline state are not offered the online service. In the case where the user wants to continue using the client apparatus whose status is managed in the offline state, the unavailability of the online service detracts from the ease of use. The inventors have thus conceived of techniques that introduce a new management status for client apparatuses so as to improve the ease of use of the client apparatus in the offline state.

One object of the present invention is therefore to manage the status of the client apparatus suitably to improve its ease of use for the user.

Solution to Problem

In solving the above problem and according to one embodiment of the present invention, there is provided an information processing apparatus for making use of a service offered by a server system including at least one server, the service being configured in such a manner that only one of multiple client apparatuses from which a single user signs in using a single user account is allowed to be in an online state that enables game execution. The information processing apparatus includes: a login management section configured to allow the user to log in to the information processing apparatus; a status management section configured to manage status of the information processing apparatus; and a change instruction acceptance section configured to accept an instruction for change of status from the server. When the change instruction acceptance section accepts the instruction for change of status, the status management section changes the currently managed status to the status designated by the instruction. When the user has logged in to the information processing apparatus that in turn has signed in to the service, the status management section manages the information processing apparatus in either a first status or a second status, the first status being a status in which the information processing apparatus is in the online state and allowed to use the service, the second status being a status in which the information processing apparatus is in an offline state that disables game execution and is allowed to use the service.

According to another embodiment of the present invention, there is provided a status management method for use with an information processing apparatus making use of a service configured in such a manner that only one of multiple client apparatuses from which a single user signs in using a single user account is allowed to be in an online state that enables game execution. The status management method includes the steps of: allowing the user to log in to the information processing apparatus; managing status of the information processing apparatus; and accepting an instruction for change of status from a server. The status managing step changes the currently managed status to the status designated by the instruction for change of status. When the user has logged in to the information processing apparatus that in turn has signed in to the service, the status managing step manages the information processing apparatus in either a first status or a second status, the first status being a status in which the information processing apparatus is in the online state and allowed to use the service, the second status being a status in which the information processing apparatus is in an offline state that disables game execution and is allowed to use the service.

According to a further embodiment of the present invention, there is provided a server system for offering a service configured in such a manner that only one of multiple client apparatuses from which a single user signs in using a single user account is allowed to be in an online state that enables game execution. The server system includes: a status management section configured to manage status of a client apparatus; a change notification acceptance section configured to accept a notification of change of status from a client apparatus; and a change instruction transmission section configured to transmit an instruction for change of status to a client apparatus. When the change notification acceptance section accepts a notification of change to first status that is an online state from a first client apparatus to which the user has logged in, the first client apparatus having signed in to the server system using the user account, the status management section sets status of the first client apparatus to the first status. When the change notification acceptance section accepts the notification of change to first status from a second client apparatus to which the user has logged in, the second client apparatus having signed in to the server system using the same user account, the status management section sets status of the second client apparatus to the first status and the status of the first client apparatus to a second status that is an offline state that keeps the user logged in while disabling game execution, and the change instruction transmission section transmits an instruction for change to second status to the first client apparatus.

According to an even further embodiment of the present invention, there is provided a status management method for managing client apparatus status in conjunction with a server system offering a service configured in such a manner that only one of multiple client apparatuses from which a single user signs in using a single user account is allowed to be in an online state that enables game execution. The status management method includes the steps of: managing status of a client apparatus; accepting a notification of change of status from a client apparatus; and transmitting an instruction for change of status to a client apparatus. When the change notification accepting step accepts a notification of change to first status that is an online state from a first client apparatus to which the user has logged in, the first client apparatus having signed in to the server system using the user account, the status managing step sets status of the first client apparatus to the first status. When the change notification accepting step accepts the notification of change to first status from a second client apparatus to which the user has logged in, the second client apparatus having signed in to the server system using the same user account, the status managing step sets status of the second client apparatus to the first status and the status of the first client apparatus to a second status that is an offline state that keeps the user logged in while disabling game execution, and the change instruction transmitting step transmits an instruction for change to second status to the first client apparatus.

Incidentally, if other combinations of the above-outlined composing elements or the above expressions of the present invention are converted between different forms such as a method, an apparatus, a system, a recording medium, and a computer program, they still constitute effective embodiments of the present invention.

BRIEF DESCRIPTION OF DRAWINGS

FIG. 3 is a tabular diagram that lists status categories of a client apparatus.

FIG. 8 is a sequence diagram depicting how status management of an information processing apparatus and of a processing unit is implemented.

DESCRIPTION OF EMBODIMENT

Figure 1:
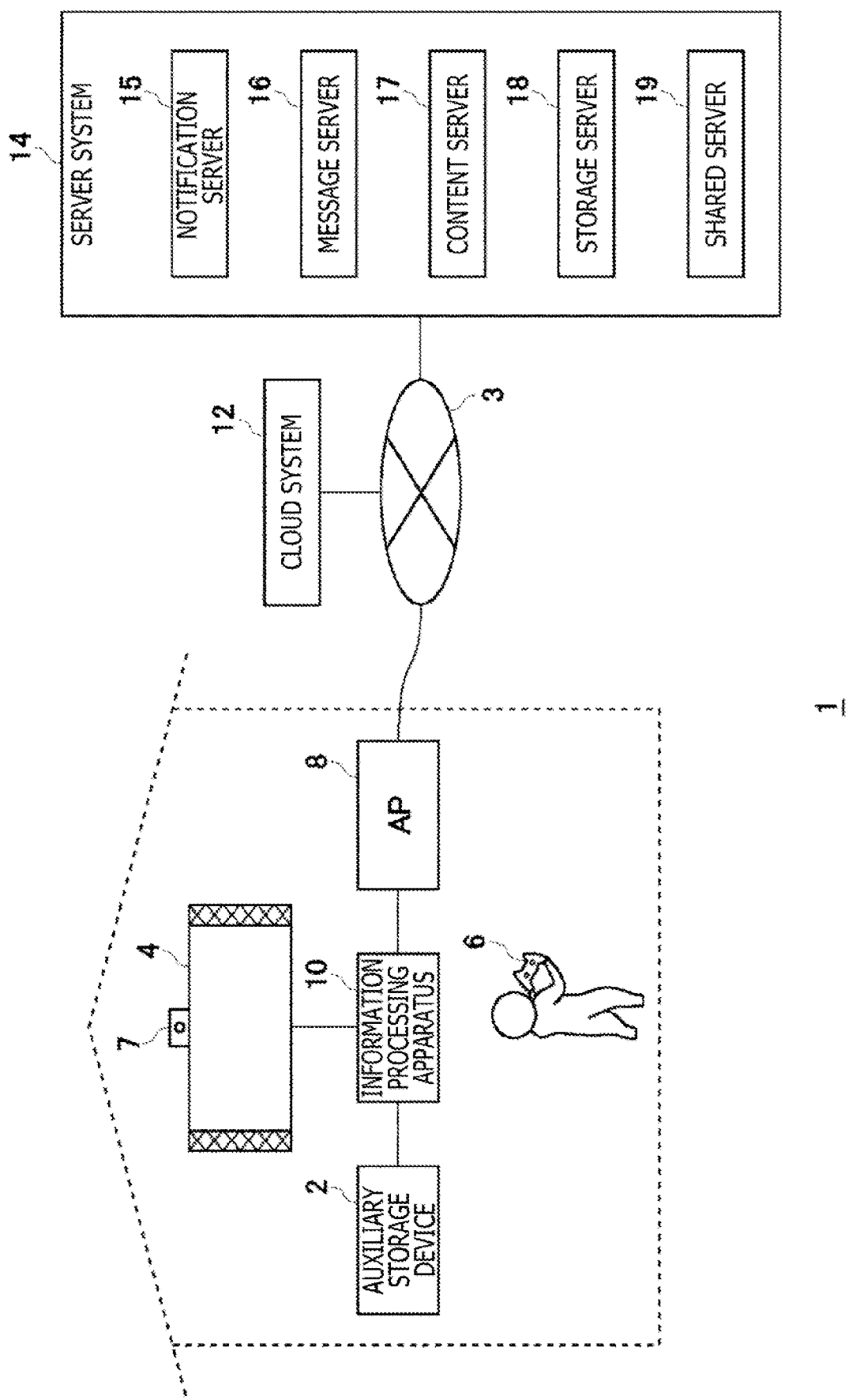
FIG. 1 is s a schematic diagram depicting an information processing system as one embodiment of the present invention.

FIG. 1 depicts an information processing system 1 as one embodiment of the present invention. The information processing system 1 includes an information processing apparatus 10 acting as a client apparatus operated by a user, a cloud system 12, and a server system 14. The information processing apparatus 10, the cloud system 12, and the server system 14 are communicably connected with one another via a network 3 such as the Internet. In this embodiment, the information processing apparatus 10 may be a non-portable game console.

An access point (referred to as the AP hereunder) 8 has the functions of a wireless access point and of a router. The information processing apparatus 10 is connected with the AP 8 by wire or wirelessly, and the AP 8 is in turn connected with the network 3. An auxiliary storage device 2 is a mass storage device such as a hard disk drive (HDD) or a flash memory. The auxiliary storage device 2 may be either an external storage device connected with the information processing apparatus 10 via a universal serial bus (USB), for example, or a built-in storage device. An output device 4 may be a TV set that has a display for outputting images and speakers for outputting sounds. Alternatively, the output device 4 may be a computer display. A camera 7 acting as an imaging device disposed near the output device 4 captures the space around the output device 4. The information processing apparatus 10 is connected by wire or wirelessly with an input device 6 operated by the user. The input device 6 outputs to the information processing apparatus 10 operating information indicative of the results of operations performed by the user.

The input device 6 may be a game controller that includes multiple input sections such as multiple pushbuttons, and analog sticks and a rotary button for inputting analog quantities. Alternatively, the input device 6 may be an input interface device such as a keyboard, a mouse, or a touch pad. Upon receipt of the operating information from the input device 6, the information processing apparatus 10 gets the received information reflected in the processing of system software (operating system (OS)) or of applications. The information processing apparatus 10 outputs the result of the processing from the output device 4.

The cloud system 12, provided apart from the server system 14, offers cloud gaming to users. The cloud system 12 causes the operating information offered by the input device 6 and transmitted from the information processing apparatus 10 to be reflected in the processing of a cloud game, and distributes by streaming the video and audio data of the game to the information processing apparatus 10. The information processing apparatus 10 transmits the operating information from the input device 6 to the cloud system 12, receives the streaming data distributed by the cloud system 12, and outputs the received data from the output device 4.

The cloud system 12 includes multiple processing units each having the function of arithmetic processing, and assigns one processing unit to each user. For example, in the case where the cloud system 12 has 10,000 processing units, 10,000 users can access the cloud system 12 to play cloud games. In the information processing system 1, the processing unit assigned to a user is regarded, from the viewpoint of the server system 14, as a client apparatus operated by the user to process games.

The server system 14 includes at least one server that offers network services to the client apparatus. In this embodiment, the server system 14 includes a notification server 15, a message server 16, a content server 17, a storage server 18, and a shared server 19. The notification server 15 offers the service of giving push notification of messages and instructions. The notification server 15 plays the role of giving pushing notification of messages and instructions generated by the other servers such as the message server 16, the content server 17, the storage server 18, and the shared server 19 in this case, to client apparatuses.

The message server 16 generates various messages about games and friends for the user, such as a message indicative of the online status of a registered friend, a message for requesting friend registration, and a message for invitation to a game. The content server 17 transmits content such as game programs to client apparatuses. The client apparatus downloads the content from the content server 17. The storage server 18 stores save data from games and backup data from the auxiliary storage device 2. The shared server 19 streams the video and audio data of the game being played by the user to the terminal apparatuses of viewers/listeners, and uploads previous game videos of the user to a sharing website. The notification server 15 gives push notification of the messages generated primarily by the message server 16 to the client apparatus. In the case where messages and instructions are generated by the content server 17, the storage server 18, or the shared server 19, the notification server 15 gives push notification of the messages and instructions thus generated to the client apparatus. The server system 14 may include multiple servers as illustrated, or may be constituted by a single server having the functions of these servers.

In order to receive a network service offered by the server system 14, the user needs to log in to the information processing apparatus 10 and thereby sign in to the network service of interest. As will be discussed later, the information processing apparatus 10 of this embodiment maintains a signed-in status even after the user logs out so that part of the network service may be received continuously. In any case, it is necessary to sign in to a network service for the information processing apparatus 10 to receive the service.

Login Process

When the user turns on the main power supply of the information processing apparatus 10, the information processing apparatus 10 causes the output device 4 to display a login screen including icon images associated with user accounts for login purposes. The user selects his or her icon image and, where a login passcode is set, inputs the passcode. The information processing apparatus 10 performs user authentication on the basis of the input passcode and allows the user to log in upon successful authentication. This user authentication is only an example. Alternatively, the user may input the user account for login and a passcode, and the information processing apparatus 10 may execute user authentication based on the input user account and passcode. As another alternative, the information processing apparatus 10 may match the user's face image captured by the camera 7 against a previously registered user face image for user authentication. After logging in to the information processing apparatus 10, the user can make use of the information processing apparatus 10.

Sign-in Process

When the user logs in, the information processing apparatus 10 automatically signs in to the network service using the user account for sign-in. After the information processing apparatus 10 has signed in to the network service, the user can make use of the network service offered by the server system 14.

Figure 2:
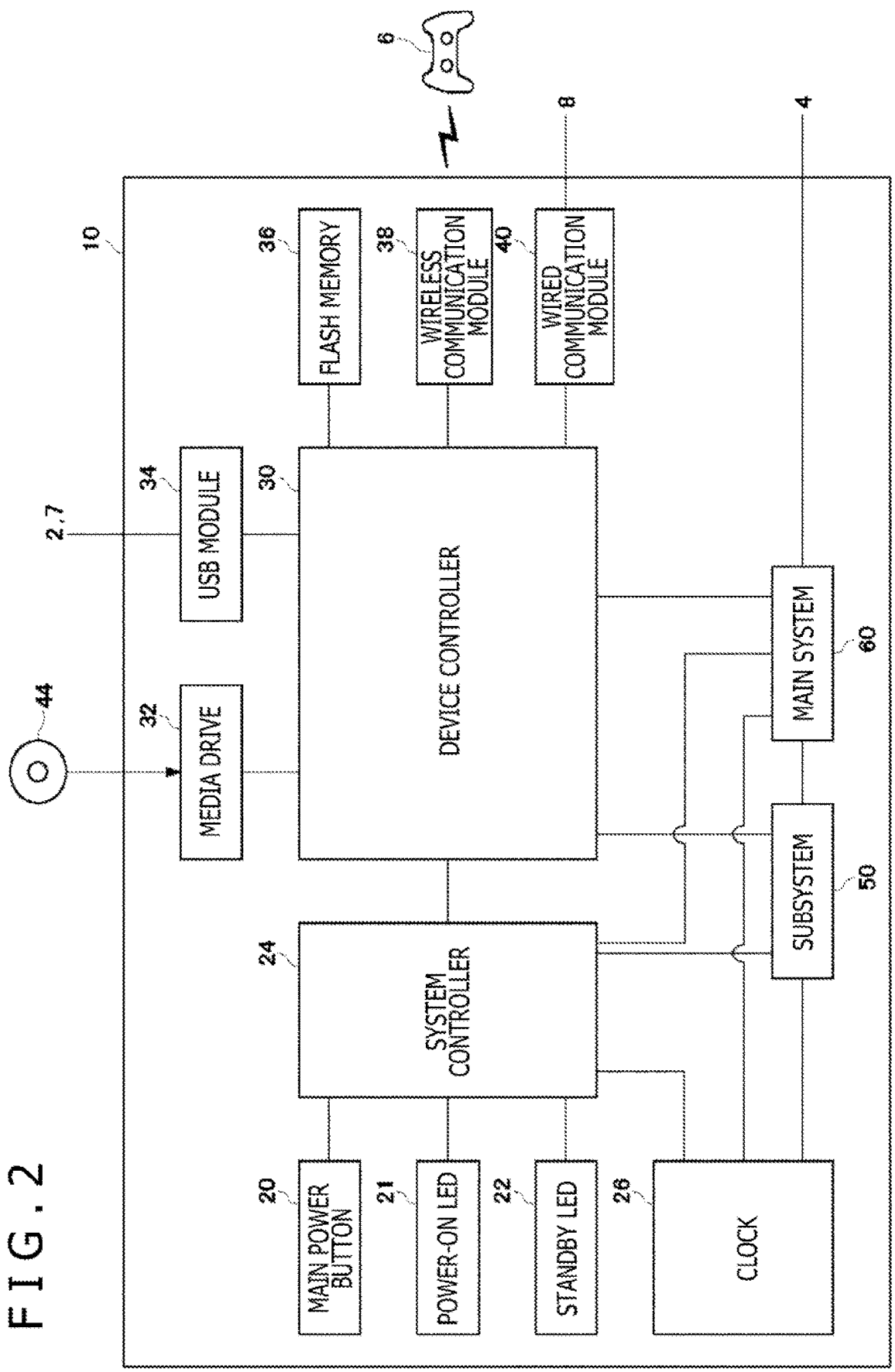
FIG. 2 is a functional block diagram of an information processing apparatus.

FIG. 2 is a functional block diagram of the information processing apparatus 10. The information processing apparatus 10 includes a main power button 20, a power-on light-emitting diode (LED) 21, a standby LED 22, a system controller 24, a clock 26, a device controller 30, a media drive 32, a USB module 34, a flash memory 36, a wireless communication module 38, a wired communication module 40, a subsystem 50, and a main system 60.

The main system 60 includes a central processing unit (CPU), a memory and a memory controller constituting a main storage unit, and a graphics processing unit (GPU). The GPU is used mainly for the arithmetic processing of game programs. These functions may be implemented as a system-on-chip that may be formed in a single chip. The main CPU has the functions of starting the OS and executing applications installed in the auxiliary storage device 2 in the environment provided by the OS. Where the information processing system 1 is configured as a cloud computing system, the main CPU has the function of causing the output device 4 to output the game images and game sounds provided by the cloud system 12.

The subsystem 50 includes a sub CPU, and a memory and a memory controller constituting a main storage unit, but excludes a GPU. The number of circuit gates in the sub CPU is smaller than that in the main CPU. The operating power consumption of the sub CPU is lower than that of the main CPU. The sub CPU is active while the main CPU is in a standby status. The sub CPU has its processing functions limited so as to minimize power consumption. When the subsystem 50 remains active with the main system 60 in the standby status, the information processing apparatus 10 is held continuously in the signed-in status.

The main power button 20 is an input section on which the user performs an input operation. Disposed at the front of a housing accommodating the information processing apparatus 10, the main power button 20 is operated to turn on or off the supply of power to the main system 60 of the information processing apparatus 10. When the main power supply is turned off, the main system 60 is placed in the standby status. The power-on LED 21 is lit when the main power button 20 is switched on. The standby LED 22 is lit when the main power button 20 is switched off.

The system controller 24 detects whether the main power button 20 is pressed by the user. With the main power supply turned off, pressing the main power button 20 causes the system controller 24 to acquire the pressing operation as an on-instruction. On the other hand, with the main power supply turned on, pressing the main power button 20 cases the system controller 24 to acquire the pressing operation as an off-instruction. The clock 26 is a real-time clock that generates current date and time information and supplies the generated information to the system controller 24, to the subsystem 50, and to the main system 60.

The device controller 30 is configured as a large-scale integrated circuit (LSI) that, like a Southbridge, performs exchanges of information between devices. As illustrated, the device controller 30 is connected with devices such as the system controller 24, the media drive 32, the USB module 34, the flash memory 36, the wireless communication module 38, the wired communication module 40, the subsystem 50, and the main system 60. The device controller 30 absorbs differences in electrical characteristics and in data transfer rates between the devices, thereby controlling the timing of data transfers therebetween.

The media drive 32 is a drive device that has a read-only memory (ROM) medium 44 loaded therein and drives the loaded ROM medium 44 to read programs and data therefrom, the ROM medium 44 having software recorded thereon including game applications and their license information. The ROM medium 44 is a read-only recording medium such as an optical disk, a magneto-optical disk, or a Blu-ray disk.

The USB module 34 is connected with an external device via a USB cable. The USB module 34 may also be connected with the auxiliary storage device 2 and the camera 7 by USB cables. The flash memory 36 is an auxiliary storage device that constitutes internal storage. The wireless communication module 38 communicates wirelessly with the input device 6 according to a communication protocol such as the Bluetooth (registered trademark) or Institute of Electrical and Electronics Engineers (IEEE)802.11 protocol. The wired communication module 40 communicates by wire with an external device and is connected with the network 3 via the AP 8.

Meanwhile, the user may possess multiple client apparatuses that can be used in connection with the information processing system 1. There may be cases where the user is in possession of multiple information processing apparatuses 10 as non-portable game consoles or where the user possesses a handheld game console or a terminal such as a smartphone in addition to the information processing apparatus 10. In such cases, it will be ideal to play games on each of the multiple client apparatuses from the viewpoint of the user. From the viewpoint of the service provider, however, dealing with the games being played simultaneously on multiple client apparatuses requires establishing a very complicated scheme to reliably execute the process of synchronizing the game data. Given the multiple client apparatuses from which the user signs in using one user account, the server system 14 of this embodiment manages the status of each client apparatus in such a manner as to set only one client apparatus to the online state that enables game execution.

Whereas the server system 14 may separately possess a dedicated server for managing the status of client apparatuses, it is the notification server 15 in this embodiment that manages the status of client apparatuses. The notification server 15 may notify the other servers of the currently managed status in real time. Alternatively, each server may independently manage the status of client apparatuses.

FIG. 3 lists the management status of a client apparatus. The client apparatus is managed in four status categories: "cutoff," "standby," "active," and "listen." The management status is shared in the information processing system 1. That is, the status of each client apparatus is managed not only by the server system 14 but also by the client apparatus itself in any one of the four status categories.

The information "apparatus presence" in the drawing is information for managing whether each client apparatus is online or offline in the network service. A client apparatus in the online state is enabled to execute games and is offered the network service in full. A client apparatus in the offline state, on the other hand, is disabled from executing games and is offered only part of the network service even when continuously signing in thereto. Since the server system 14 performs status management in such a manner that given multiple client apparatuses from which one user signs in, only one of them is allowed to be in the online state. Thus only one client apparatus is allowed to go online per user.

Of the four status categories, the active status is a status in which the presence information is "online state." Thus solely one of the multiple client apparatuses of the user is set to the active status. The other client apparatuses of the user are set to any one of the cutoff status, the standby status, and the listen status for which the presence information is "offline state." It is to be noted that "online state" and "offline state" are nominal designations for status management purposes and that the designations are not a problem with an offline-state client apparatus being connected with the network 3 and continuously signing in to the server system 14.

The server system 14 provides the client apparatus with two types of network services. In the description that follows, the two types of network services will be referred to as "online service" and "offline service" in line with the nominal designations of the presence information.

The online service is a service offered to the online-state client apparatus enabled to execute games. For example, a save data storage service offered by the storage server 18 and a streaming service offered by the shared server 19 for distributing video and audio data of the game being played fall under the category of the online service. The online service further includes a push notification service offered by the notification server 15 for giving push notification to only the online-state client apparatus. For example, the push notification service applies to the process of giving notification of such messages as "A friend is now online" and "An invitation to a game has come from a friend" generated by the message server 16. In the ensuing description, the service offered by the notification server 15 as one type of online service will be referred to as "first push notification." The first push notification is performed for the client apparatus to display messages.

The offline service is a service offered to the client apparatuses in both the online state and the offline state. That is, the offline service is offered to the signed-in client apparatuses regardless of whether they are in the online state or in the offline state. For example, a content download service offered by the content server 17 falls under the category of the offline service. The offline service further includes the push notification service offered by the notification server 15 to both the online-state client apparatus and the offline-state client apparatus. For example, when the content server 17 automatically transmits to the client apparatuses such content as game trailers or trial versions of games regardless of requests from the user, the process performed by the notification server 15 to give notification that the content will be transmitted falls under the category of the push notification service. In the description that follows, the service offered by the notification server 15 as one type of offline service will be referred to as "second push notification." The second push notification is not primarily intended for display on the client apparatuses. The second push notification instead is carried out to designate processes in the client apparatuses.

As an exception for this embodiment, the client apparatus placed in the offline state but set nevertheless to the listen status is arranged to receive the first push notification from the notification server 15. It is to be noted that the client apparatus in the listen status is managed in the offline state so that this client apparatus is disabled from executing games or receiving the online service offered by the storage server 18 or by the shared server 19.

Explained below are the relations between each of the status categories and the push notification service.

(1) "Cutoff" Status

The cutoff status is a status in which the connection between the client apparatus and the server system 14 is cut off. Since the client apparatus in the cutoff status is disconnected from the notification server 15, the notification server 15 does not perform the first push notification or the second push notification. The presence information is the offline state.

(2) "Standby" Status

The standby status is a status in which the user has yet to log in to the client apparatus but the client apparatus is connected with the server system 14 and has signed in to the network service. The client apparatus in the standby status is offline and enabled to receive the offline service from the server system 14. Thus the notification server 15 performs the second push notification to the client apparatus in the standby status.

(3) "Active" Status

The active status is a status in which the user has logged in to the client apparatus that in turn is connected with the server system 14 and has signed in to the network service. The client apparatus in the active status is online and enabled to receive both the offline service and the online service from the server system 14. Thus the notification server 15 performs the first push notification and the second push notification to the client apparatus in the active status. In the case where the user possesses multiple client apparatuses, only one client apparatus is allowed to be set to the active status.

(4) "Listen" Status

The listen status is a status in which the user has logged in to the client apparatus that in turn is connected with the server system 14 and has signed in to the network service, with the presence information being the offline state. For this reason, the client apparatus in the listen status is disabled from executing games. Although it can receive the offline service from the server system 14, the client apparatus in the listen status is disabled from receiving the online service in principle.

However, the listen status is configured as a special status in which an offline-state client apparatus can receive the first push notification included in the online service. With this embodiment, where the information processing apparatus 10 uses the cloud system 12, the listen status is established to let notification of messages be given to the user operating the information processing apparatus 10. This point will be discussed later in more detail following the subsequent explanation of the components of the information processing apparatus 10.

Figure 4:
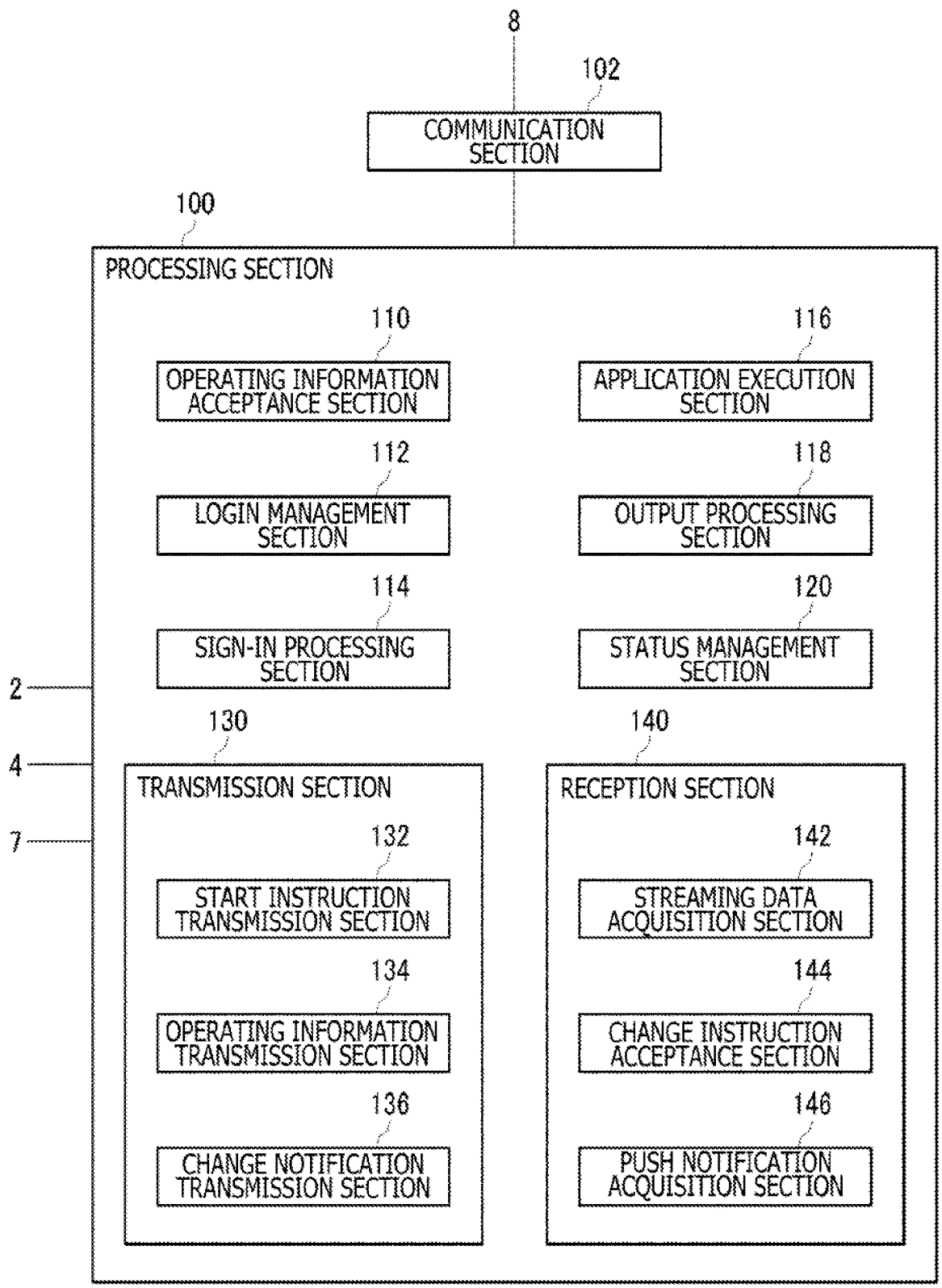
FIG. 4 is a schematic diagram depicting a configuration of the information processing apparatus.

First, the configuration of the information processing apparatus 10 as the client apparatus is explained. FIG. 4 depicts a configuration of the information processing apparatus 10. The information processing apparatus 10 includes a processing section 100 and a communication section 102. The processing section 100 includes an operating information acceptance section 110, a login management section 112, a sign-in processing section 114, an application execution section 116, an output processing section 118, a status management section 120, a transmission section 130, and a reception section 140. The transmission section 130 includes a start instruction transmission section 132, an operating information transmission section 134, and a change notification transmission section 136. The reception section 140 includes a streaming data acquisition section 142, a change instruction acceptance section 144, and a push notification acquisition section 146. The communication section 102 is configured to have the functions of both the wireless communication module 38 and the wired communication module 40 depicted in FIG. 2.

The components noted in FIG. 4 as functional blocks for performing various processes may be implemented in hardware such as circuit blocks, memories, and other LSIs, or in software such as programs loaded into memory. Thus it will be understood by those skilled in the art that these functional blocks are realized in hardware alone, in software alone, or by a combination of both in diverse forms and are not limited to any of such forms.

The operating information acceptance section 110 accepts operating information from the input device 6. The login management section 112 allows the user to log in to the information processing apparatus 10 through predetermined user authentication. The sign-in processing section 114 allows the logged-in user to sign in to the network service.

The application execution section 116 has the function of executing game programs held in the auxiliary storage device 2 or recorded on the ROM medium 44. The application execution section 116 can execute game programs only when the active status is being set. The output processing section 118 outputs game images and game sounds to the output device 4. The status management section 120 manages the status of the information processing apparatus 10. The status management section 120 manages the status of the information processing apparatus 10 by retaining the status information and, if there occurs a change in status, updates the status information.

In the case where the user has logged in to the information processing apparatus 10 that in turn has signed in to the service, the status management section 120 of this embodiment manages the status of the information processing apparatus 10 in one of two status categories: in the active status in which the information processing apparatus 10 is online and enabled to execute games and use the service, or in the listen status in which the information processing apparatus 10 is offline, disabled from executing games, and allowed to partially use the service.

The start instruction transmission section 132 transmits a start instruction to start a cloud game to the cloud system 12. The operating information transmission section 134 transmits the operating information coming from the input device 6 to the cloud system 12. The change notification transmission section 136 transmits a notification of change of status to the notification server 15.

The streaming data acquisition section 142 acquires streaming data of the game from the cloud system 12. The change instruction acceptance section 144 accepts an instruction for change of status from the notification server 15. When the change instruction acceptance section 144 accepts the instruction for change of status, the status management section 120 changes the currently managed status to the status designated by the instruction for change. Specifically, the status management section 120 updates the currently retained status information to the status information designated by the instruction for change. The push notification acquisition section 146 acquires push notifications from the notification server 15.

The configuration of the notification server 15 is explained next.

Figure 5:
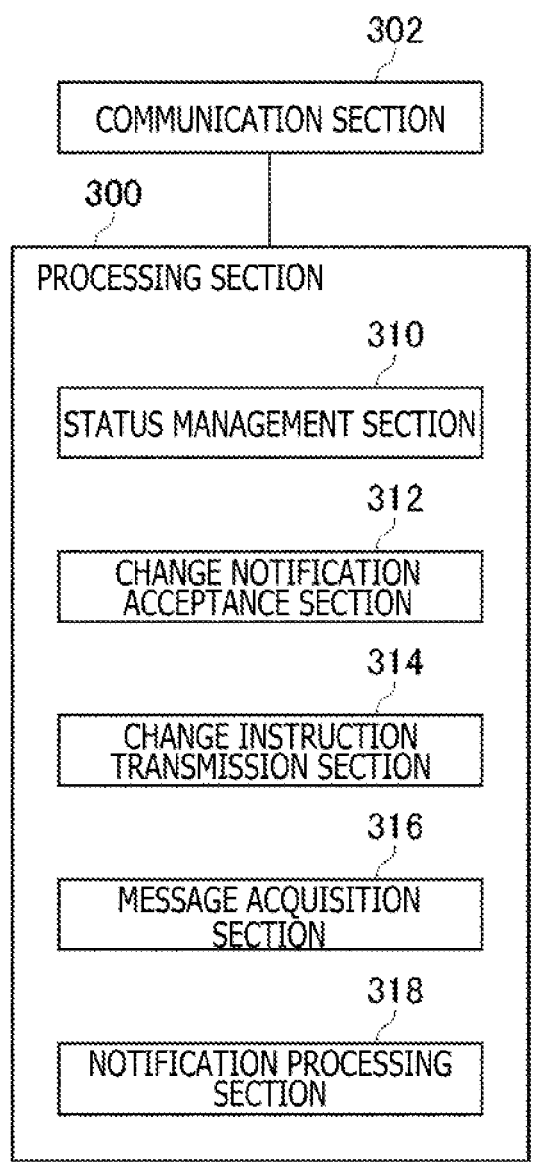
FIG. 5 is a schematic diagram depicting a configuration of a notification server.

FIG. 5 depicts a configuration of the notification server 15. The notification server 15 includes a processing section 300 and a communication section 302. The processing section 300 includes a status management section 310, a change notification acceptance section 312, a change instruction transmission section 314, a message acquisition section 316, and a notification processing section 318.

The components noted in FIG. 5 as functional blocks for performing various processes may be implemented in hardware such as circuit blocks, memories, and other LSIs, or in software such as programs loaded into memory. Thus it will be understood by those skilled in the art that these functional blocks are realized in hardware alone, in software alone, or by a combination of both in diverse forms and are not limited to any of such forms.

The status management section 310 manages the status of the client apparatuses. The status management section 310 manages the status of each client apparatus by holding the status information regarding the client apparatus and, if there occurs a change in status, updates the relevant status information. For purpose of explanation with this embodiment, the status management section 310 manages the status of a single user's client apparatuses. In practice, the status management section 310 manages the status of the client apparatuses of all users making use of the network service.

The change notification acceptance section 312 accepts a notification of change of status from a client apparatus. The change instruction transmission section 314 transmits the instruction for change of status to the client apparatus. The message acquisition section 316 acquires messages from various servers in the server system 14. The notification processing section 318 gives push notification of the messages to the client apparatus.

As explained above, the server system 14 allows only one of the multiple client apparatuses from which one user signs in using the same user account to be in the online state, and manages the other client apparatuses in the offline state. Explained below are basic techniques by which the notification server 15 in the server system 14 manages the status of multiple client apparatuses.

Figure 6:
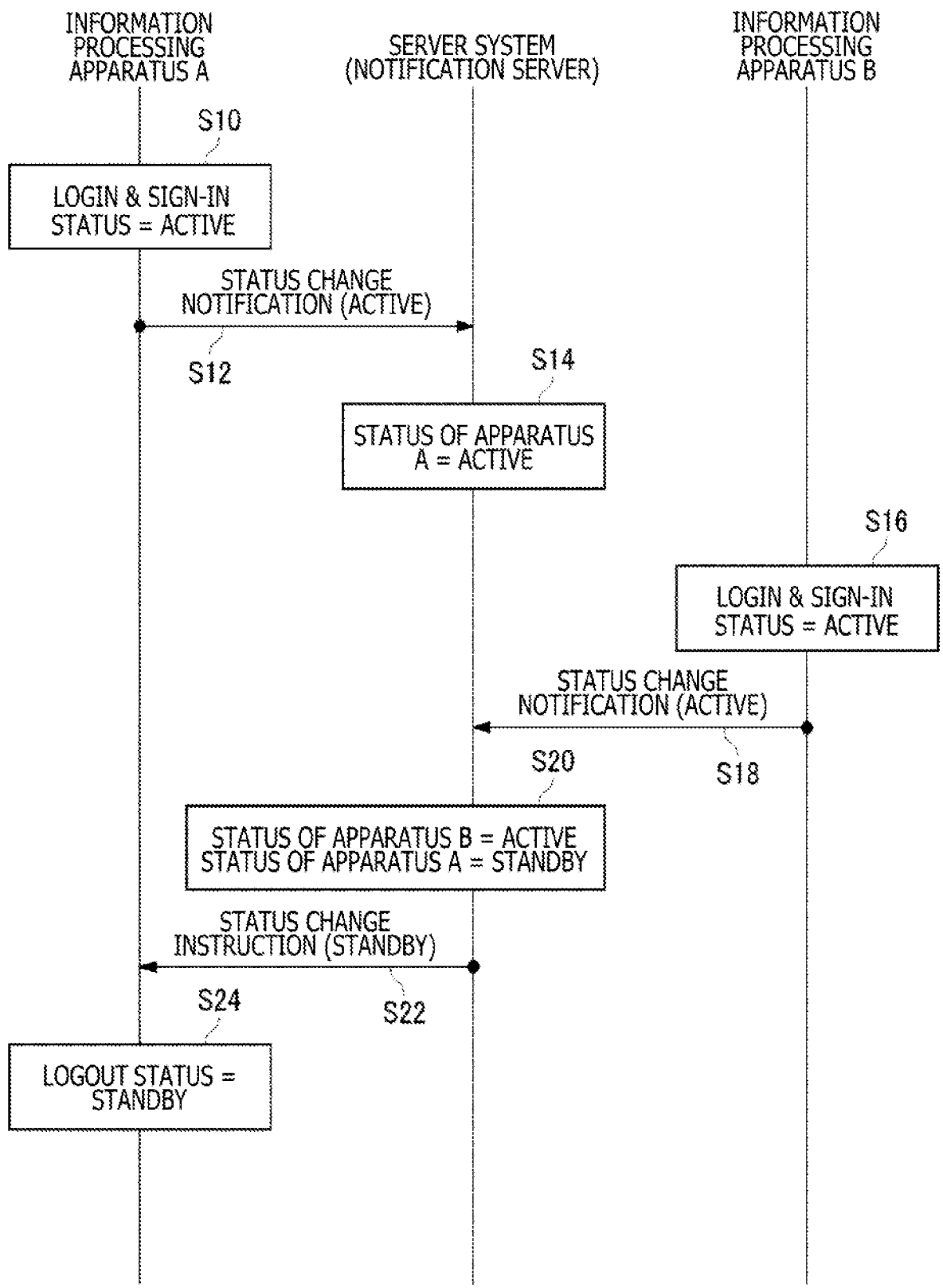
FIG. 6 is a sequence diagram depicting how status management of two information processing apparatuses is implemented.

FIG. 6 depicts the sequence in which status management of two information processing apparatuses is implemented. In FIG. 6, the information processing apparatuses A and B as client apparatuses are each a game console having the configuration of the information processing apparatus 10 illustrated in FIG. 4. The information processing apparatuses A and B are operated by the same user.

First, the user turns on the main power supply of the information processing apparatus A. This causes the output processing section 118 of the information processing apparatus A to display on the output device 4 a login screen including the icon images of users. When the user selects his or her icon image and inputs a passcode, the login management section 112 performs passcode authentication and allows the user to log in to the information processing apparatus A. After the login management section 112 has allowed the user to log in, the sign-in processing section 114 performs an automatic sign-in process using the user account of the logged-in user. The status management section 120 sets the status of the information processing apparatus A to the active status (S10). As described above, the status management section 120 manages the status of the information processing apparatus A by retaining the status information. Thus the status management section 120 retains active status information indicating that the active status is in effect.

The change notification transmission section 136 then transmits a notification of change to active status to the notification server 15 (S12). At this time, the change notification transmission section 136 inserts into the notification of change of status the identification information identifying the information processing apparatus A, user account information, and login time information indicting the time at which the user logged in to the information processing apparatus A. When the change notification acceptance section 312 in the notification server 15 accepts from the information processing apparatus A the notification of change to active status, the status management section 310 sets the status of the information processing apparatus A to the active status (S14). As with the status management section 120, the status management section 310 sets the status of the information processing apparatus A to the active status by retaining the active status information as the status information regarding the information processing apparatus A.

Thereafter, the user turns on the main power supply of the information processing apparatus B. In the same procedure as with the information processing apparatus A, the login management section 112 of the information processing apparatus B allows the user to log in. The sign-in processing section 114 performs an automatic sign-in process using the user account. The status management section 120 sets the status of the information processing apparatus B to the active status (S16). The change notification transmission section 136 then transmits the notification of change to active status to the notification server 15 (S18). The change notification transmission section 136 inserts into the notification of change of status the identification information identifying the information processing apparatus B, user account information, and login time information indicating the time at which the user logged in to the information processing apparatus B.

In the notification server 15, the change notification acceptance section 312 accepts the notification of change to active status from the information processing apparatus B and transfers the notification to the status management section 310. The status management section 310 manages the status of the client apparatuses on the basis of user accounts. The status management section 310 confirms that the notification of change of status from the information processing apparatus B is in conflict with the active status set to the information processing apparatus A. Since the status management section 310 allows only one client apparatus to be in the active status per user, either the information processing apparatus A or the information processing apparatus B alone can be set to the active status.

Generally, the user tends to use the client apparatus to which the user most recently logged in as the main client apparatus. Thus by referencing the login time information included in the notification of change of status, the status management section 310 sets the last-logged-in client apparatus to the active status according to what is known as the last-come-first-served rule. In the example in FIG. 6, the login time of the information processing apparatus B is later than that of the information processing apparatus A (i.e., the login time of the information processing apparatus B is closest to the current time), so that the status management section 310 sets the status of the information processing apparatus B to the active status and the status of the information processing apparatus A to the standby status (S20). Through application of the last-come-first-served rule, the status management section 310 performs status management to set only one client apparatus to the active status. When the status management section 310 changes the status of the information processing apparatus A, the change instruction transmission section 314 transmits an instruction for change to standby status to the information processing apparatus A (S22).

In the information processing apparatus A, the change instruction acceptance section 144 accepts the instruction for change to standby status. The change instruction acceptance section 144 transfers the accepted instruction to the login management section 112 and to the status management section 120. In turn, the login management section 112 causes the user to log out of the information processing apparatus A. The status management section 120 sets the status of the information processing apparatus A to the standby status. Specifically, the status management section 120 changes the currently retained active status information to standby status information (S24). The above was an explanation of the status management technique to which the last-come-first-served rule is applied.

With this embodiment, the user makes use of the cloud gaming offered by the cloud system 12.

Figure 7:
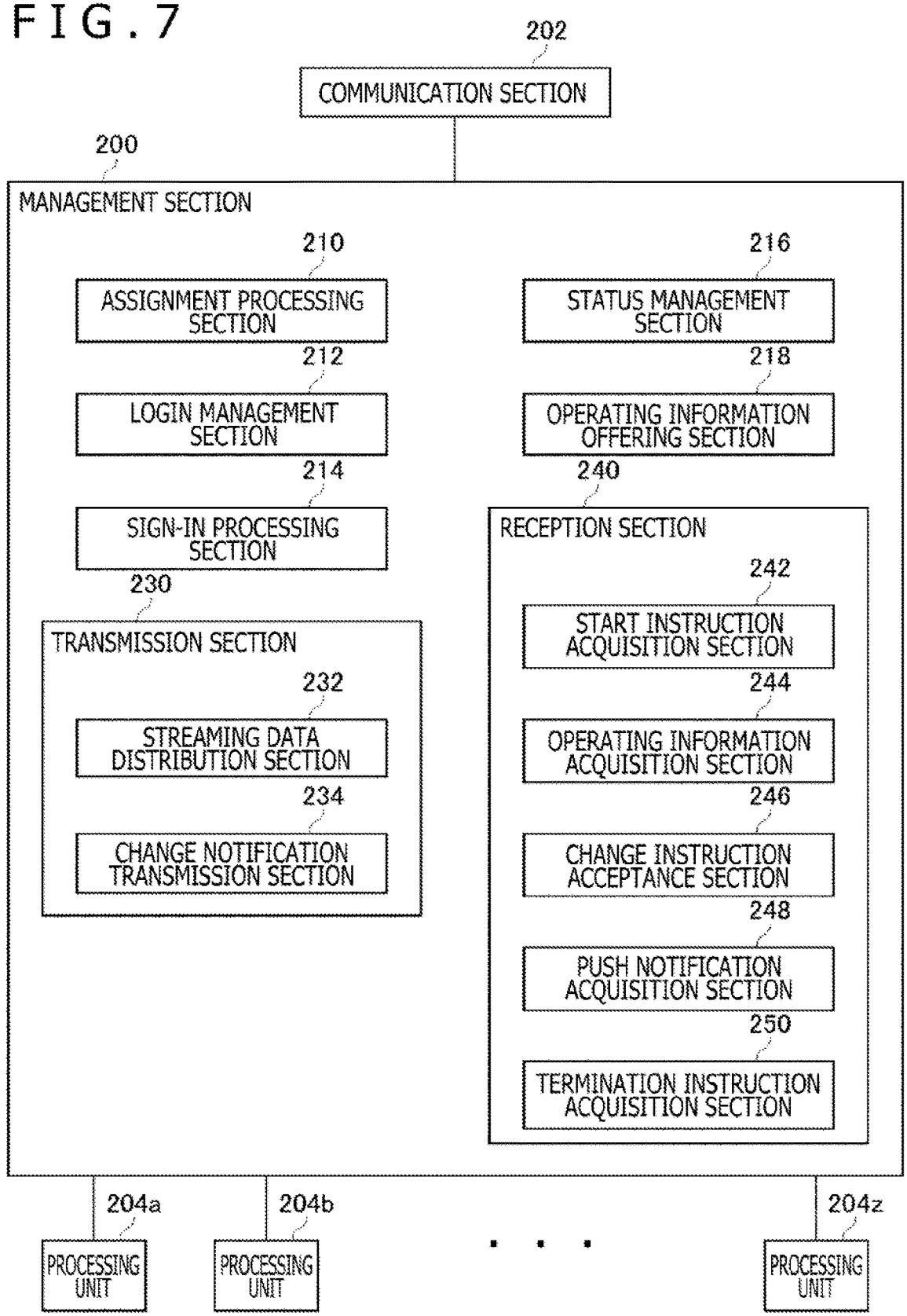
FIG. 7 is a schematic diagram depicting a configuration of a cloud system.

FIG. 7 depicts a configuration of the cloud system 12. The cloud system 12 includes a management section 200, a communication section 202, and multiple processing units 204a, 204b, . . . 204z (generically referred to as the "processing unit 204" where appropriate). Each of the multiple processing units 204 has the function of reading a disk image of a game from a database, not depicted, so as to execute the relevant game program. The processing unit 204 may have the same function as that of the application execution section 116 in the information processing apparatus 10.

The management section 200 includes an assignment processing section 210, a login management section 212, a sign-in processing section 214, a status management section 216, an operating information offering section 218, a transmission section 230, and a reception section 240. The transmission section 230 includes a streaming data distribution section 232 and a change notification transmission section 234. The reception section 240 includes a start instruction acquisition section 242, an operating information acquisition section 244, a change instruction acceptance section 246, a push notification acquisition section 248, and a termination instruction acquisition section 250.

The components noted in FIG. 7 as functional blocks for performing various processes may be implemented in hardware such as circuit blocks, memories, and other LSIs, or in software such as programs loaded into memory. Thus it will be understood by those skilled in the art that these functional blocks are realized in hardware alone, in software alone, or by a combination of both in diverse forms and are not limited to any of such forms.

In response to a request from a user, the assignment processing section 210 assigns a processing unit 204 to the user. The login management section 212 allows the user who is assigned the processing unit 204 to log in to that processing unit 204. The sign-in processing section 214 allows the user who has logged in to the processing unit 204 to sign in to the network service using the user account for sign-in. Thus the server system 14 deals with the processing unit 204 assigned to the user as the client apparatus of the user.

The status management section 216 manages the status of the processing unit 204 assigned to the user. The operating information offering section 218 offers the operating information sent from the information processing apparatus 10 of the user to the processing unit 204 assigned to the user. In turn, the processing unit 204 causes the operating information regarding the user to be reflected in the processing of the game.

The streaming data distribution section 232 distributes to the information processing apparatus 10 the streaming data of the game processed by the processing unit 204. The change notification transmission section 234 transmits a notification of change of status to the notification server 15.

The start instruction acquisition section 242 acquires an instruction to start the cloud game from the information processing apparatus 10. The operating information acquisition section 244 acquires the operating information on the input device 6 from the information processing apparatus 10. The change instruction acceptance section 246 accepts the notification of change of status from the notification server 15. The push notification acquisition section 248 acquires a push notification from the notification server 15. The termination instruction acquisition section 250 acquires an instruction to terminate the cloud game from the information processing apparatus 10.

Explained below is the status management technique for establishing a session between the information processing apparatus 10 in the active status and the cloud system 12 in order to let the user play a cloud game. As explained above, the processing unit 204 assigned to the user in the cloud system 12 signs in to the server system 14 using the same user account as that of the information processing apparatus 10. Thus in the sequence depicted in FIG. 6, the information processing apparatus A corresponds to "the information processing apparatus 10" and the information processing apparatus B to "the assigned processing unit 204 in the cloud system 12" in order of their login times.

As a result, when the status management section 310 performs status management in accordance with the last-come-first-served rule at the start of the cloud game, the processing unit 204 is set to the active status and the information processing apparatus 10 is set to the standby status in S20. During execution of the cloud game, the information processing apparatus 10 outputs to the output device 4 the game images distributed by streaming from the processing unit 204. The processing unit 204 in the active status acquires messages provided by the notification server 15 using the first push notification, and superimposes the acquired messages on the game images. This allows the user to view the messages superimposed on the game images being streamed.

However, given a screen switching instruction from the user playing the cloud game, the information processing apparatus 10 may cause the output device 4 to output system images and images of applications other than the ongoing game in place of the game images. For example, there may be a case where the user temporarily stops the ongoing game to get a system screen displayed from which a browser is started to display a walkthrough site of the game. At this time, the output device 4 does not display the game images being streamed. That means the user cannot view the messages superimposed on the game images by the processing unit 204.

Thus in this embodiment, where the information processing apparatus B with the later login time corresponds to "the assigned processing unit 204 in the cloud system 12," the information processing apparatus A with the earlier login time is set not to the standby status but to the listen status in which a first push notification service is received from the notification server 15. The information processing apparatus 10 is then enabled to acquire the first push notification from the notification server 15. As a result, even when the screen of the cloud game is changed to the system screen, the user can view in real time the messages offered by the first push notification.

FIG. 8 depicts the sequence in which status management of the information processing apparatus and of the processing unit is implemented with this embodiment. When the user turns on the main power supply of the information processing apparatus 10, the output processing section 118 displays on the output device 4 a login screen including the icon images of users. When the user selects his or her icon image and inputs a passcode, the login management section 112 performs passcode authentication and allows the user to log in to the information processing apparatus 10. After the login management section 112 has allowed the user to log in, the sign-in processing section 114 performs an automatic sign-in process using the user account of the logged-in user. The status management section 120 sets the status of the information processing apparatus 10 to the active status (S100). The status management section 120 sets the status of the information processing apparatus 10 by retaining the active status information indicating that the active status is in effect.

The change notification transmission section 136 then transmits a notification of change to active status to the notification server 15 (S102). At this time, the change notification transmission section 136 inserts into the notification of change of status the identification information identifying the information processing apparatus 10, user account information, and login time information indicting the time at which the user logged in to the information processing apparatus 10.

In the notification server 15, the change notification acceptance section 312 accepts the notification of change to active status from the information processing apparatus 10. This causes the status management section 310 to set the status of the information processing apparatus 10 to the active status. Specifically, the status management section 310 retains the active status information indicating that the active status is in effect as the status information regarding the information processing apparatus 10 (S104). With the information processing apparatus 10 set to the active status, the application execution section 116 is enabled to execute game programs and ready to receive in full the service offered by the server system 14.

Then the user starts the cloud game by operating the input device 6 of the information processing apparatus 10 (S106). For example, the output processing section 118 displays on the output device 4 the game icon images for selecting cloud games. When the user selects the icon image of a desired cloud game, the start instruction transmission section 132 transmits to the cloud system 12 an instruction to start the cloud game. The start instruction includes information regarding the user account for identifying the user.

In the cloud system 12, the start instruction acquisition section 242 acquires the instruction to start the cloud game. This causes a streaming session to be established between the information processing apparatus 10 and the cloud system 12 (S108). At this time, the assignment processing section 210 assigns a processing unit 204 to the user, the login management section 212 allows the user to log in to the processing unit 204, and the sign-in processing section 214 allows the user to sign in to the notification server 15 using the user account. In turn, the status management section 216 sets the processing unit 204 assigned to the user to the active status (S112). The change notification transmission section 234 proceeds to transmit a notification of change to active status to the notification server 15 (S114). The change notification transmission section 234 inserts into the notification of change the login time information indicating the time at which the user logged in to the processing unit 204, user account information, and information for identifying the processing unit 204. With the streaming session established, in the information processing apparatus 10, the status management section 120 waits for the instruction for change of status to be transmitted from the notification server 15 (S110).

In the notification server 15, the change notification acceptance section 312 accepts a notification of change to active status from the cloud system 12 and transfers the accepted notification to the status management section 310. The status management section 310 has the function of distinguishing the notification of change of status sent from the cloud system 12 from the notification of change of status transmitted from the information processing apparatus 10. For example, the notification of change of status sent from the cloud system 12 may include additional information indicating that the notification is transmitted from the cloud system 12. The additional information enables the status management section 310 to recognize that the notification of change to active status is transmitted from the cloud system 12.

The status management section 310 managing the status of client apparatuses based on user accounts confirms that the notification of change of status from the processing unit 204 is in conflict with the active status set to the information processing apparatus 10. Thus the status management section 310 compares the login time included in the notification of change of status transmitted in S114 with the login time included in the notification of change of status sent in S102. As a result of the comparison, the status management section 310 determines that the login time in the notification of change of status sent from the processing unit 204 in S114 is later than the login time in the other notification.

Upon recognizing that the notification of change of status in S114 is transmitted from the cloud system 12, the status management section 310 performs status management in a manner different from that in S20 of FIG. 6. That is, in the case where the notification of change of status is sent from the cloud system 12, the status management section 310 sets the status of the processing unit 204 to the active status and the status of the information processing apparatus 10 to the listen status (S116). By applying the last-come-first-served rule in this way, the status management section 310 carries out status management in a manner allowing only one client apparatus to be set to the active status per user. With the status of the information processing apparatus 10 changed by the status management section 310, the change instruction transmission section 314 transmits an instruction for change to listen status to the information processing apparatus 10 (S118). This instruction for change includes information for identifying the processing unit 204.

In the information processing apparatus 10, the change instruction acceptance section 144 accepts the instruction for change to listen status and transfers the accepted instruction to the status management section 120. The status management section 120 sets the status of the information processing apparatus 10 to the listen status. Specifically, the status management section 120 updates the currently retained active status information to listen status information (S120).

Because the login state is maintained in the listen status, the user can continuously operate the information processing apparatus 10. Preferably, the status management section 120 may set the listen status on condition that an instruction for change of status is offered in S110 where the instruction is being awaited.

That is, the information processing apparatus 10 can transition to the listen status only if the cloud game is started by the information processing apparatus 10 itself. Whether the information processing apparatus 10 itself has started the cloud game is determined by whether the status management section 120 is in a wait status in S110. That is, where it has yet to start the cloud game, the information processing apparatus 10 does not transition to the listen status upon accepting the instruction for change to listen status because the status management section 120 is not in the wait status to await an instruction for change.

For that reason, if the change instruction acceptance section 144 accepts an instruction for change to listen status from the notification server 15 where the start instruction transmission section 132 in the information processing apparatus 10 has yet to transmit a game start instruction to the cloud system 12 and where another information processing apparatus has started a cloud game, the login management section 122 may cause the user to log out and the status management section 120 may change the status of the apparatus to the standby status because the status management section 120 is not in the wait status in S110.

The user can play the cloud game from the information processing apparatus 10 in the listen status. During game play, the operating information acceptance section 110 accepts the operating information from the input device 6 and the operating information transmission section 134 transmits the accepted operating information to the cloud system 12. In the cloud system 12, the operating information acquisition section 244 acquires the operating information and the operating information offering section 218 offers the acquired operating information to the processing unit 204 assigned to the user. This causes the processing unit 204 to have the operating information reflected in the progress of the game program and to generate the streaming data of the game. The streaming data distribution section 232 transmits the streaming data to the information processing apparatus 10. In the information processing apparatus 10, the streaming data acquisition section 142 acquires the streaming data and the output processing section 118 outputs the acquired streaming data from the output device 4. This is how the user plays the cloud game.

While the user is playing the cloud game, the notification server 15 offers the first push notification service and the second push notification service not only to the processing unit 204 in the online state but also to the information processing apparatus 10 in the offline state. Specifically, in the notification server 15, the message acquisition section 316 acquires the messages generated by the servers in the server system 14 and the notification processing section 318 gives push notification of the generated messages to both the processing unit 204 and the information processing apparatus 10.

In the cloud system 12, the push notification acquisition section 248 acquires the push notifications transmitted from the notification server 15. The processing unit 204 superimposes the acquired notification messages on the game images. This allows the user during game play to view the notification messages included in the streaming data and to notice, for example, that the user has been invited by a friend to a game.

Also with this embodiment, the push notification acquisition section 146 in the information processing apparatus 10 in the listen status also acquires the push notifications transmitted from the notification server 15. This allows the user to view the notification messages transmitted from the notification server 15 while temporarily stopping the cloud game to get the system screen displayed on the output device 4, for example. In this manner, the information processing system 1 introduces the listen status in which the information processing apparatus 10 in the offline state can still receive the notification service while the cloud game is being played. The listen status thus enables the user to view the notification messages from the notification server 15 even when playing the cloud game.

Thereafter, the user terminates the cloud game (S122). When the termination instruction acquisition section 250 in the cloud system 12 acquires a cloud game termination instruction, the streaming session between the information processing apparatus 10 and the cloud system 12 is terminated (S124).

In the information processing apparatus 10, with the cloud game terminated, the status management section 120 sets the status of the information processing apparatus 10 to the active status (S126). The change notification transmission section 136 transmits a notification of change to active status to the notification server 15 (S130). The notification of change includes the information for identifying the processing unit 204 assigned to the user.

In the cloud system 12, with the cloud game terminated, the login management section 212 causes the user to log out of the processing unit 204. The sign-in processing section 214 causes the user to sign out of the service. In turn, the status management section 216 sets the status of this processing unit 204 to the cutoff status (S128). The change notification transmission section 234 transmits a notification of change to cutoff status to the notification server 15 (S132).

In the notification server 15, the change notification acceptance section 312 accepts the notifications of change of status from both the information processing apparatus 10 and the cloud system 12 and transfers the accepted notifications to the status management section 310. On the basis of these notifications of change of status, the status management section 310 sets the status of the information processing apparatus 10 to the active status and the status of the processing unit 204 to the cutoff status (S134). After terminating the cloud game, the information processing apparatus 10 returns to the active status and is enabled to execute games. Also, the information processing apparatus 10 is offered the network service in full by the server system 14.

The sequence depicted in FIG. 8 indicates the case where the cloud game is normally terminated and, in the cloud system 12, the user logout process is performed normally in S128. By contrast, in a case where the streaming session between the information processing apparatus 10 and the cloud system 12 is abnormally terminated, the user logout process is not normally carried out on the side of the cloud system 12. On the other hand, in the information processing apparatus 10 following abnormal termination of the streaming session, the status management section 120 is notified of an end of the cloud game and thus sets the status of the information processing apparatus 10 to the active status (S126). The change notification transmission section 136 transmits a notification of change to active status to the notification server 15 (S130). This notification of change includes login time information.

In the notification server 15, as explained above, the status management section 310 operates by the last-come-first-served rule based on the login times of client apparatuses. The login time of the information processing apparatus 10 is always earlier than that of the processing unit 204. For this reason, strict application of the last-come-first-served rule would cause the status management section 310 to always reject the notification of change to active status from the information processing apparatus 10 in the listen status.

Thus if the notification of change to active status transmitted from the information processing apparatus 10 includes the information for identifying the processing unit 204, the status management section 310 performs status change regardless of the login times. In the sequence depicted in FIG. 8, the notification server 15 receives the notification of change of status from the cloud system 12 in S132. Even if the notification of change of status is not received, the status management section 310 may execute the status update process in S134 upon receipt of the notification of change of status from the information processing apparatus 10 in S130. At this time, the status management section 310 may set the status of the processing unit 204 to the cutoff status and the change instruction transmission section 314 may transmit an instruction for change to cutoff status to the processing unit 204. In the cloud system 12, the change instruction acceptance section 246 accepts the instruction for change of status. In turn, the status management section 216 sets the status of the processing unit 204 to the cutoff status.

The present invention has been described above in conjunction with a specific embodiment. It is to be understood by those skilled in the art that suitable combinations of the constituent elements and of various processes of the embodiment described above as an example will lead to further variations of the present invention and that such variations also fall within the scope of the present invention. For example, although the cloud system 12 for this embodiment offers cloud gaming, the cloud system 12 may offer other cloud services.

REFERENCE SIGNS LIST

1 . . . Information processing system, 10 . . . Information processing apparatus, 12 . . . Cloud system, 14 . . . Server system, 15 . . . Notification server, 100 . . . Processing section, 112 . . . Login management section, 114 . . . Sign-in processing section, 120 . . . Status management section, 130 . . . Transmission section, 132 . . . Start instruction transmission section, 134 . . . Operating information transmission section, 136 . . . Change notification transmission section, 140 . . . Reception section, 142 . . . Streaming data acquisition section, 144 . . . Change instruction acceptance section, 146 . . . Push notification acquisition section, 200 . . . Management section, 204 . . . Processing unit, 212 . . . Login management section, 214 . . . Sign-in processing section, 216 . . . Status management section, 230 . . . Transmission section, 232 . . . Streaming data distribution section, 234 . . . Change notification transmission section, 240 . . . Reception section, 242 . . . Start instruction acquisition section, 244 . . . Operating information acquisition section, 246 . . . Change instruction acceptance section, 248 . . . Push notification acquisition section, 250 . . . Termination instruction acquisition section, 300 . . . Processing section, 310 . . . Status management section, 312 . . . Change notification acceptance section, 314 . . . Change instruction transmission section, 316 . . . Message acquisition section, 318 . . . Notification processing section.

INDUSTRIAL APPLICABILITY

The present invention may be applied in the field where the status of client apparatuses connected with a network is managed.

The invention claimed is:

1. An information processing apparatus for signing in to a network service using a user account for sign-in of a user, the network service being offered by a server system including at least one server;
the server system offering the network service in such a manner that a plurality of client apparatuses including the information processing apparatus are allowed to sign in using the same user account, the network service enabling only one of the client apparatuses to execute a game, the information processing apparatus comprising:
a login management section configured to allow the user to log in to the information processing apparatus;
a status management section configured to manage status of the information processing apparatus; and
a change instruction acceptance section configured to accept an instruction for change of status from the server,
wherein, when the change instruction acceptance section accepts the instruction for change of status, the status management section changes the currently managed status to the status designated by the instruction, and,
when the user has logged in to the information processing apparatus that in turn has signed in to the network service, the status management section manages the information processing apparatus in either a first status or a second status, the first status being a status in which the information processing apparatus is in the online state that enables game execution and is allowed to use a push notification service that gives push notification of a message for display on the information processing apparatus, the second status being a status in which the information processing apparatus is in an offline state that disables game execution and is allowed to use the push notification service.

2. The information processing apparatus according to claim 1, further comprising:
a change notification transmission section configured to transmit a notification of change of status to the server,
wherein, when the login management section allows the user to log in, the status management section sets the status to the first status and the change notification transmission section transmits a notification of change to first status to the server, and,
when the change instruction acceptance section accepts an instruction for change to second status, the status management section changes the status to the second status.

3. The information processing apparatus according to claim 2,
wherein the push notification service is offered by a push notification server included in the server system.

4. The information processing apparatus according to claim 3, further comprising:
a start instruction transmission section configured to transmit a game start instruction to a cloud system,
wherein, when the change instruction acceptance section accepts the instruction for change to second status from the notification server after the start instruction transmission section has transmitted the game start instruction to the cloud system, the status management section changes the status to the second status.

5. The information processing apparatus according to claim 4,
wherein the instruction for change includes information for identifying a processing unit assigned in the cloud system for execution of a game.

6. The information processing apparatus according to claim 5,
wherein, after execution of the game with the cloud system, the change notification transmission section transmits to the notification server the notification of change to first status including the information for identifying the processing unit.

7. The information processing apparatus according to claim 4,
wherein, when the change instruction acceptance section accepts the instruction for change to second status from the notification server in a case where the start instruction transmission section has yet to transmit the game start instruction to the cloud system, the login management section causes the user to log out of the information processing apparatus and the status management section changes the status to a third status in which the user has yet to log in to the information processing apparatus.

8. A status management method of an information processing apparatus for signing in to a network service using a user account for sign-in of a user, the network service being offered by a server system including at least one server;
the server system offering the network service in such a manner that a plurality of client apparatuses including the information processing apparatus are allowed to sign in using the same user account, the network service enabling only one of the client apparatuses to execute a game, the status management method comprising:

allowing the user to log in to the information processing apparatus;

managing status of the information processing apparatus; and accepting an instruction for change of status from a server, wherein the status managing changes the currently managed status to the status designated by the instruction for change of status, and, when the user has logged in to the information processing apparatus that in turn has signed in to the network service, the status managing manages the status of the information processing apparatus in either a first status or a second status, the first status being a status in which the information processing apparatus is in the online state that enables game execution and is allowed to use a push notification service that gives push notification of a message for display on the information processing apparatus, the second status being a status in which the information processing apparatus is in an offline state that disables game execution and is allowed to use the push notification service.

9. A program for use on a computer for signing in to a network service using a user account for sign-in of a user, the network service being offered by a server system including at least one server, the program for the computer, comprising:

by a login management section, allowing the user to log in to the information processing apparatus;

by a status management section, managing status of the information processing apparatus; and by a change instruction acceptance section, accepting an instruction for change of status from a server, wherein the server system offers the network service in such a manner that a plurality of client apparatuses including the computer are allowed to sign in using the same user account, the network service enabling only one of the client apparatuses to execute a game, the status managing includes changing the currently managed status to the status designated by the instruction for change of status, and, when the user has logged in to the information processing apparatus that in turn has signed in to the network service, the status managing includes managing status of the computer in either a first status or a second status, the first status being a status in which the information processing apparatus is in the online state that enables game execution and is allowed to use a push notification service that gives push notification of a message for display on the information processing apparatus, the second status being a status in which the information processing apparatus is in an offline state that disables game execution and is allowed to use the push notification service.

10. A server system for offering a network service configured in such a manner that only one of a plurality of client apparatuses from which a single user signs in using a single user account is allowed to be in an online state that enables game execution, the server system comprising:

a status management section configured to manage status of a client apparatus;

a change notification acceptance section configured to accept a notification of change of status from a client apparatus; and a change instruction transmission section configured to transmit an instruction for change of status to a client apparatus, wherein, when the change notification acceptance section accepts a notification of change to first status that is an online state from a first client apparatus to which the user has logged in, the first client apparatus having signed in to the network service using the user account, the status management section sets status of the first client apparatus to the first status, and, when the change notification acceptance section accepts the notification of change to first status from a second client apparatus to which the user has logged in, the second client apparatus having signed in to the network service using the same user account, the status management section sets status of the second client apparatus to the first status and the status of the first client apparatus to a second status that is an offline state that keeps the user logged in while disabling game execution, and the change instruction transmission section transmits an instruction for change to second status to the first client apparatus.

11. The server system according to claim 10, wherein the second client apparatus is a processing unit assigned in a cloud system for execution of a game upon receipt of an instruction from the first client apparatus.

12. The server system according to claim 10, wherein the change instruction transmission section inserts information for identifying the second client apparatus in to the instruction for change.

13. The server system according to claim 12, wherein, when the change notification acceptance section accepts the notification of change to first status from the first client apparatus in the second status, the status management section sets the status of the first client apparatus to the first status.

14. The server system according to claim 13, wherein the notification of change from the first client apparatus in the second status includes the information for identifying the second client apparatus.

15. The server system according to claim 10, further comprising:

a notification server configured to give push notification to the first client apparatus and to the second client apparatus.

16. A status management method for managing client apparatus status in conjunction with a server system offering a network service configured in such a manner that only one of a plurality of client apparatuses from which a single user signs in using a single user account is allowed to be in an online state that enables game execution, the status management method comprising:

managing status of a client apparatus;

accepting a notification of change of status from a client apparatus; and transmitting an instruction for change of status to a client apparatus, wherein, when the change notification accepting accepts a notification of change to first status that is an online state from a first client apparatus to which the user has logged in, the first client apparatus having signed in to the network service using the user account, the status managing sets status of the first client apparatus to the first status, and, when the change notification accepting accepts the notification of change to first status from a second client apparatus to which the user has logged in, the second client apparatus having signed in to the network service using the same user account, the status managing sets status of the second client apparatus to the first status and the status of the first client apparatus to a second status that is an offline state that keeps the user logged in while disabling game execution, and the change instruction transmitting transmits an instruction for change to second status to the first client apparatus.

17. A program for use on a computer offering a network service configured in such a manner that only one of a plurality of client apparatuses from which a single user signs in using a single user account is allowed to be in an online state that enables game execution, the program for the computer comprising:
by a status management section, managing status of a client apparatus;
by a change notification acceptance section, accepting a notification of change of status from a client apparatus; and
by a change instruction transmission section, transmitting an instruction for change of status to a client apparatus,
wherein, when the change notification accepting accepts a notification of change to first status that is an online state from a first client apparatus to which the user has logged in, the first client apparatus having signed in to the network service using the user account, the status managing sets status of the first client apparatus to the first status, and,
when the change notification accepting accepts the notification of change to first status from a second client apparatus to which the user has logged in, the second client apparatus having signed in to the network service using the same user account, the status managing sets status of the second client apparatus to the first status and the status of the first client apparatus to a second status that is an offline state that keeps the user logged in while disabling game execution, and the change instruction transmitting transmits an instruction for change to second status to the first client apparatus.

* * * * *